(12) United States Patent
MacNeil et al.

(10) Patent No.: US 10,837,772 B2
(45) Date of Patent: Nov. 17, 2020

(54) ELECTRONIC DEVICES HAVING PRESSURE SENSORS AND BAROMETRIC VENTS

(71) Applicant: Apple Inc., Cupertino, CA (US)

(72) Inventors: David MacNeil, Cupertino, CA (US);
William S. Lee, Fremont, CA (US);
Eric N. Nyland, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/122,833

(22) Filed: Sep. 5, 2018

(65) Prior Publication Data

US 2019/0072384 A1    Mar. 7, 2019

Related U.S. Application Data

(60) Provisional application No. 62/555,005, filed on Sep. 6, 2017.

(51) Int. Cl.
| | |
|---|---|
| *G01C 5/00* | (2006.01) |
| *G01C 5/06* | (2006.01) |
| *G01L 19/00* | (2006.01) |
| *G01L 19/14* | (2006.01) |

(52) U.S. Cl.
CPC ............ *G01C 5/06* (2013.01); *G01L 19/0046* (2013.01); *G01L 19/14* (2013.01)

(58) Field of Classification Search
CPC .................................. G01C 5/06; G01L 19/14
See application file for complete search history.

(56) References Cited

U.S. PATENT DOCUMENTS

| | | | |
|---|---|---|---|
| 10,165,694 B1* | 12/2018 | Werner | G04G 21/08 |
| 2015/0163572 A1* | 6/2015 | Weiss | H04R 1/02 381/337 |
| 2017/0041706 A1* | 2/2017 | Evans | H04R 1/086 |
| 2017/0086317 A1* | 3/2017 | Pelletier | G06F 1/1656 |
| 2017/0089698 A1* | 3/2017 | Ehman | G01L 9/0041 |
| 2018/0091881 A1* | 3/2018 | Evans | H04R 1/08 |
| 2019/0086969 A1* | 3/2019 | Macneil | G06F 1/1677 |
| 2019/0102028 A1* | 4/2019 | Keen | G06F 1/1626 |

* cited by examiner

*Primary Examiner* — Jamel E Williams
(74) *Attorney, Agent, or Firm* — Morgan, Lewis & Bockius LLP

(57) ABSTRACT

Aspects of the subject technology relate to electronic devices with pressure sensors. A pressure sensor may be mounted within a device housing in a pressure sensor cavity at or near an opening in the housing. A barometric vent between a main cavity within the housing and the pressure sensor cavity allows pressure changes in the main cavity to generate airflow through the pressure sensor cavity and out through the opening in the device housing. The generated airflow may clear debris that has occluded the opening in the housing.

20 Claims, 3 Drawing Sheets

ELECTRONIC DEVICES HAVING PRESSURE SENSORS AND BAROMETRIC VENTS

CROSS-REFERENCE TO RELATED APPLICATIONS

The present application claims the benefit of U.S. Provisional Patent Application Ser. No. 62/555,005, entitled "ELECTRONIC DEVICES HAVING PRESSURE SENSORS AND BAROMETRIC VENTS" filed on Sep. 6, 2017, which is hereby incorporated by reference in its entirety for all purposes.

TECHNICAL FIELD

The present description relates generally to portable electronic devices, and more particularly, but not exclusively, to portable electronic devices with pressure sensors.

BACKGROUND

Electronic pressure sensors are often used to obtain barometric pressure measurements for elevation and/or weather measurements. However, challenges can arise when attempting to integrate an electronic pressure sensor in a portable electronic device that can be carried among various environments and exposed to various environmental aggressors.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Portable electronic devices such as a mobile phones, portable music players, smart watches, and tablet computers are provided that include a pressure sensor for sensing environmental pressure. The pressure sensor is sometimes used for barometric pressure measurements, which can be used to identify changes in elevation. The changes in elevation are sometimes used to identify a location or exercise performed by a user of the device (e.g., by an activity monitor application running on processing circuitry of the device when the device is worn or carried by the user while the user walks or runs up a flight of stairs or up a hill).

Pressure sensors are disposed within a housing of the device and are able to sense the environmental pressure outside the housing due to airflow from outside the housing into the housing through an opening in the housing. However, the opening in the housing for the pressure sensor can become occluded by environmental aggressors such as a liquid, dry debris, oils, sunscreens or other substances, particularly in portable electronic devices that are often moved, used, and/or stored in various different environments. Occlusion of the opening can prevent the pressure sensor from receiving and/or measuring the ambient pressure of the environment surrounding the device.

In accordance with various aspects of the subject disclosure, a portable electronic device is provided that includes a pressure sensor and an associated barometric vent. As described in further detail hereinafter, the barometric vent is arranged to leverage changes in pressure within a main cavity of the housing to clear occlusions of the opening in the housing for the pressure sensor.

Figure 1:
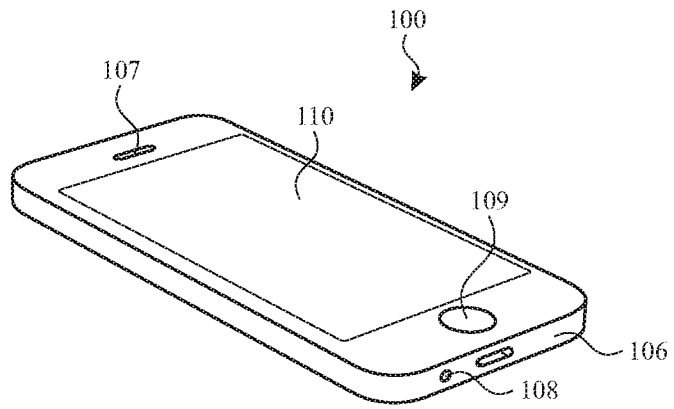
FIG. 1 illustrates a schematic diagram of an electronic device implemented as a cellular telephone having a pressure sensor and barometric vent in accordance with various aspects of the subject technology.

An illustrative electronic device of the type having a pressure sensor and an associated barometric vent is shown in FIG. 1. In the example of FIG. 1, device 100 has been implemented using a housing that is sufficiently small to fit within a user's hand (e.g., device 100 of FIG. 1 may be a handheld electronic device such as a cellular telephone). As show in FIG. 1, device 100 may include a display such as display 110 mounted on the front of housing 106. Display 110 may have openings such as an opening to accommodate button 104 and an opening to accommodate speaker port 107.

Display 110 may be a touch screen that incorporates capacitive touch electrodes or other touch sensor components or may be a display that is not touch-sensitive. Display 110 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Arrangements in which display 110 is formed using organic light-emitting diode pixels are sometimes described herein as an example. This is, however, merely illustrative. In various implementations, any suitable type of display technology may be used in forming display 110 if desired.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 and display 110 may form an enclosure within which electronic components for the operation of device 100 are enclosed. The enclosure formed by housing 106 and display 110 may include one or more separated cavities such as a main cavity and a pressure sensor cavity that is separated from the main cavity by an inner wall within the enclosure. The main cavity may be a water-resistant cavity that is substantially sealed against ingress of moisture and/or liquid. In this way, electronic components that are enclosed within the main cavity are protected against moisture damage.

As shown in FIG. 1, housing 106 may include one or more openings 108. Opening 108 is formed in an exterior wall of housing 106 to fluidly couple a pressure sensor (not visible in FIG. 1) to the environment outside of housing 106 (e.g., outside of the enclosure formed by display 110 and housing 106). A pressure sensor cavity may be formed interior to the exterior wall of housing 106 adjacent opening 108. The pressure sensor cavity may be separated from the main cavity by an inner wall (not visible in FIG. 1) so that the pressure sensor cavity can equalize pressure with the external environment through opening 108 without exposing the main cavity to moisture or liquid ingress.

The configuration of electronic device 100 of FIG. 1 is merely illustrative. In other implementations, electronic device 100 may be a laptop computer, a tablet computer, a somewhat smaller portable device such as a wrist-watch device (e.g., a smart watch), pendant device, or other wearable or miniature device, a media player, a gaming device, a navigation device, or another portable electronic device.

Figure 2:
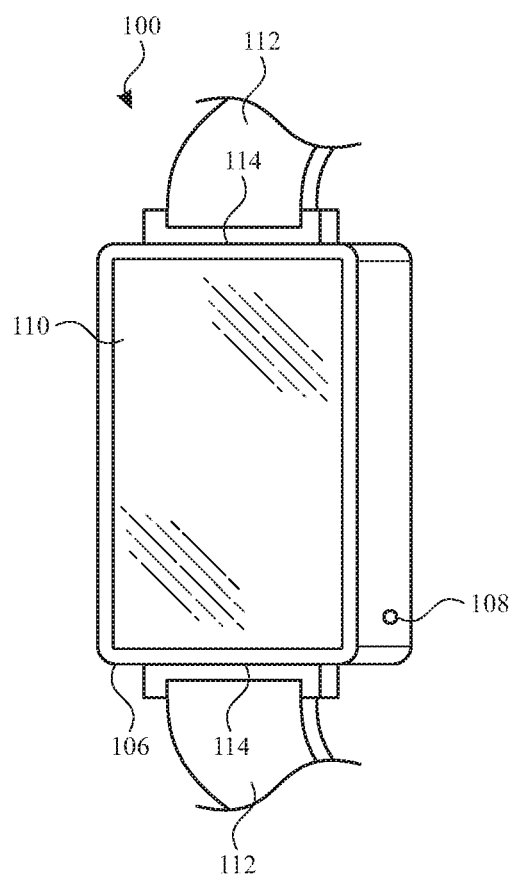
FIG. 2 illustrates a schematic diagram of an electronic device implemented as a smart watch having a pressure sensor and barometric vent in accordance with various aspects of the subject technology.

For example, FIG. 2 is a perspective view of electronic device 100 in a configuration in which electronic device 100 has been implemented in the form of a wearable device such as a smart watch that includes an opening 108 in a housing 106. As shown, in a smart watch implementation, strap 112 may be coupled to housing 106 at interfaces 114 and arranged to secure device 100 to a part of a user's body such as around the user's wrist.

Figure 3:
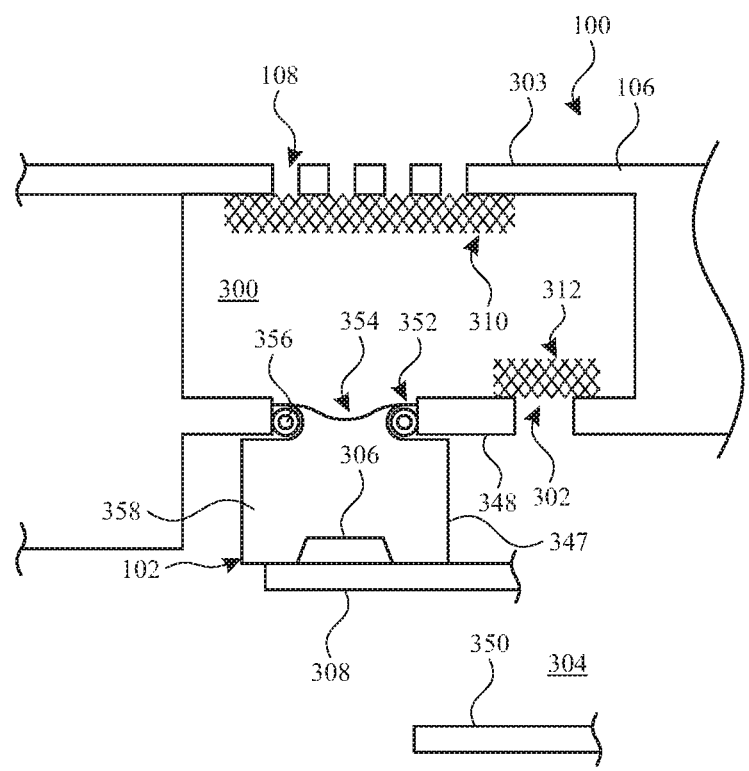
FIG. 3 illustrates a cross-sectional view of a portion of an electronic device in the vicinity of a pressure sensor and a barometric vent in accordance with various aspects of the subject technology.

FIG. 3 shows a cross-sectional view of a portion of device 100 that passes through opening 108 in housing 106. In the example of FIG. 2, multiple openings 108 (e.g., a cluster of openings) 108 are formed in the exterior wall 303 of housing 106 to fluidly couple the environment external to housing 106 to pressure sensor 102 mounted within the housing. Pressure sensor 102 includes pressure sensing and processing circuitry 306 which may include a pressure sensing element (e.g., a MEMS element, a piezo element, a membrane coupled to a capacitive or resistive transducer circuit, etc.) and may include processing circuitry for the pressure sensor.

In the example of FIG. 3, pressure sensor cavity 300 is located outside of main cavity 304 of device 100 within housing 106. Pressure sensor cavity 300 is disposed between main cavity 304 and exterior wall 303 of housing 106. Inner housing wall 348 separates pressure sensor cavity 300 from main cavity 304. Opening(s) 108 in exterior wall 303 fluidly couple pressure sensor cavity 300 to an environment outside the housing so that a pressure within the pressure sensor cavity can equalize with a pressure of the ambient air outside the housing. The pressure sensor cavity may have a volume that is small relative to the volume of the main cavity (e.g., less than 50%, less than 20%, less than 10%, less than 5%, or less than 1% of the volume of the main cavity) so that equalization of pressure in the pressure sensor cavity, with changes in pressure in the external environment, occur quickly for quick and accurate pressure measurements.

A covering such as mesh 310 may be provided over opening(s) 108 (e.g., in an interior surface of exterior wall 303). Mesh 310 may be a wire, metal, plastic, polymer or other material arranged in a woven or interlocking mesh that prevents debris such as solid debris from passing through opening(s) 108 but allows air and/or liquid to pass through opening(s) 108 into pressure sensor cavity 300.

As indicated in FIG. 3, housing 106 includes main cavity 304 in which the bulk of the electronic components 350 for the device are enclosed. For example, electronic components 350 in main cavity 304 may include a printed circuit board such as a main logic board, one or more integrated circuits on or coupled to the printed circuit board, a battery, and/or other electronic components. In order to protect components 350 in main cavity 304 from potential damage, main cavity 304 may be a water-resistant cavity that is substantially sealed against ingress of moisture or liquids.

Openings such as opening 352 and opening 302 are formed in inner wall 348. Openings 352 and 302 in inner wall 348 are sealed against moisture or liquid ingress therethrough. In the example of FIG. 3, pressure sensor 102 is partially disposed in opening 352 with a sealing member 356 (e.g., a sealing ring) compressed between pressure sensor housing 347 and the edges of opening 352. In this way, pressure sensor 102 prevents moisture or liquid from passing through opening 352 into main cavity 304.

Opening 302 is a barometric vent for main cavity 304 that is covered with sealing membrane 312. Sealing membrane 312 may be a fine mesh material or other moisture-resistant (e.g., water-resistant) and air-permeable material that allows air to flow through the membrane and prevents moisture or liquid from passing through the membrane. By allowing air to flow through membrane 312 and opening 302, opening 302 provides a barometric vent that allows pressure relief within main cavity 304. For example, device 100 can be compressed when a user squeezes, presses, sits on, or stacks objects onto display 110 and/or housing 106. Squeezing of housing 106 and/or display 110 may cause a displacement and/or a deformation of a portion of the display and/or a portion of the housing that reduces the volume of the main cavity within the housing, thereby causing a rise in pressure in the main cavity until the pressure can equalize by airflow through one or more barometric ports.

In some scenarios, pressure changes caused by a user press or squeeze can be used by processing circuitry of the device as a user input signal. However, even when pressure changes within main cavity 304 are used for user input, it can be desirable to prevent pressure buildup within main cavity 304 by allowing airflow through opening 302. Because membrane 348 is less permeable to air than mesh 310, pressure changes within main cavity 304 equalize with the environmental pressure outside housing 106 and temporary increases in pressure in main cavity can occur.

In the example of FIG. 3, barometric vent 302 is laterally displaced from opening(s) 108. However, this is merely illustrative. In some implementations, barometric vent 302 may be aligned with opening(s) 108.

As shown in the example of FIG. 3, pressure sensor 102 may be may include a portion that is disposed in main cavity 304 and a portion that extends from the main cavity into opening 352 in inner housing wall 348, such that a port 354 of pressure sensor 102 is fluidly coupled to pressure sensor cavity 300 via opening 352. In this way, the sensing portion of pressure sensor 102 (e.g., pressure sensor components and circuitry 306 and/or a connector 308 such as a flexible printed circuit for the pressure sensor) can be fluidly coupled to pressure sensor cavity 300, while sensitive electronics 306 and 308 of the pressure sensor are protected from moisture or liquid within the main cavity. Pressure sensor 102 may include a water-resistant encapsulation 358 within pressure sensor housing 347 that prevents moisture or liquid that has entered pressure sensor cavity 300 from contacting sensor components 306.

Figure 4:
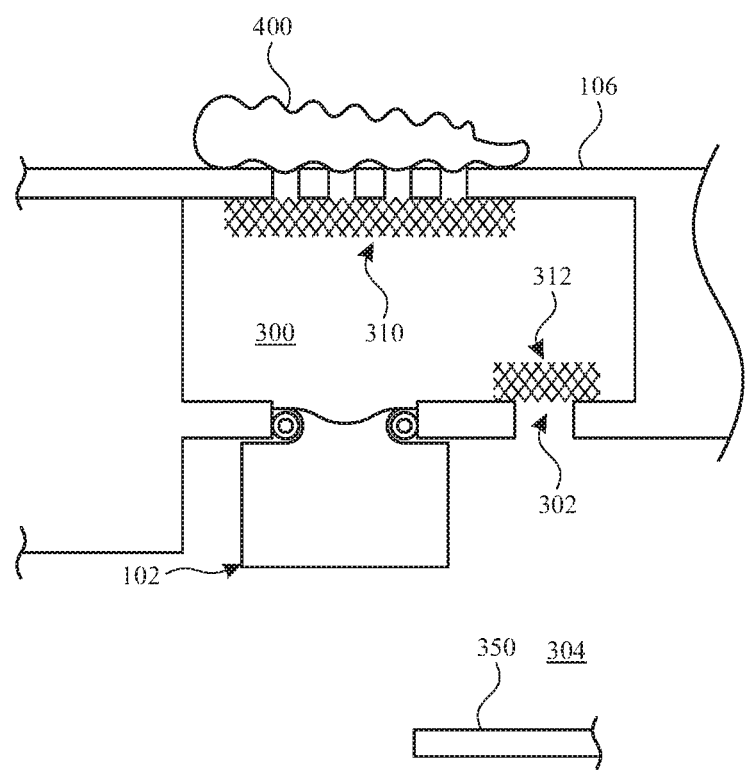
FIG. 4 illustrates a cross-sectional view of the portion of the electronic device of FIG. 3 with an obstructed sensor cavity opening in accordance with various aspects of the subject technology.

FIG. 4 shows the portion of electronic device 100 of FIG. 3 in a scenario in which debris 400 has covered opening(s) 108. Debris 400 may be skin oil, sunscreen, dirt or mud, water, snow, dust, or another environmental aggressor. Debris 400 can degrade the performance of pressure sensor 102 by obstructing airflow to pressure sensor 102 through opening(s) 108.

Figure 5:
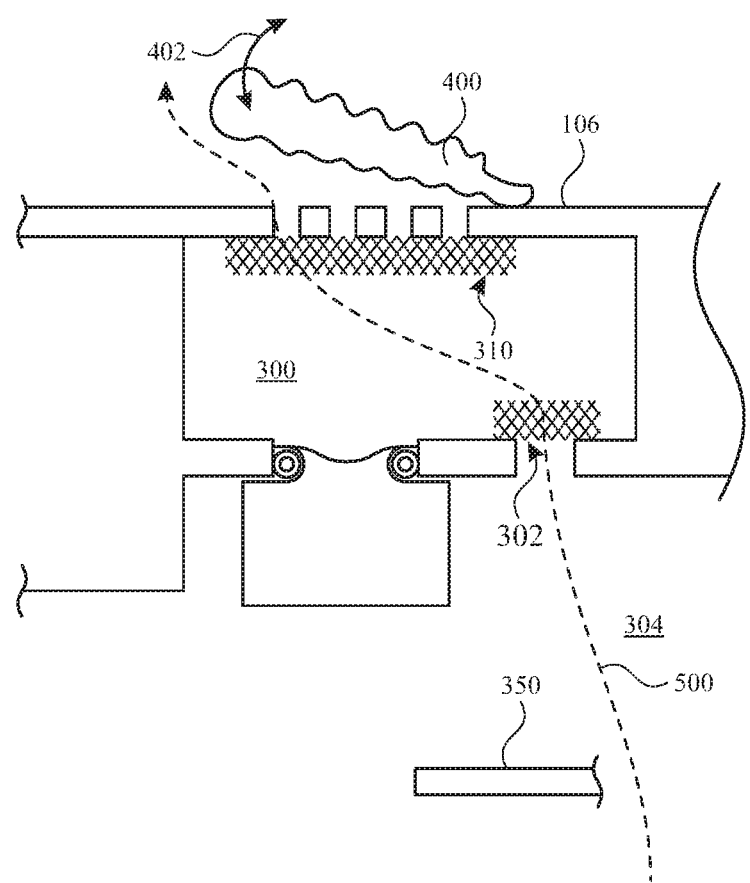
FIG. 5 illustrates a cross-sectional view of the portion of the electronic device of FIG. 4 with airflow from a barometric port clearing an obstructed sensor cavity opening for a pressure sensor in accordance with various aspects of the subject technology.

However, the arrangement of pressure sensor cavity 300 and barometric vent 302, fluidly coupled to the external environment through pressure sensor cavity 300, allows the natural use of device 100 to create airflow through the barometric vent to clear debris 400 from opening(s) 108. FIG. 5 shows an example of airflow 500, generated by an increase in pressure in main cavity 304, passing through barometric vent 302, through pressure sensor cavity 300, and out through opening(s) 108 in housing 106 to lift debris 400 (e.g., in direction 402) away from opening(s) 108.

For example, pressure may increase in main cavity 304 due a squeeze or other pressure on device 100 (e.g., a press by a user on display 110, a weight being placed on the device such as when the device is in a user's back pocket and the user sits on the device, or pressure caused by other objects contacting the device such as in a drop event or when the user stores the device in a bag or other receptacle with other objects). The increase in pressure in main cavity 304 causes airflow 500 into pressure sensor cavity 300. If debris 400 is restricting airflow through opening(s) 108, airflow 500 from main cavity 304 into pressure sensor cavity 300 will cause a pressure buildup in pressure sensor cavity 300 that places increasing pressure on debris 400, until the debris is dislodged.

In the examples of FIG. 3-5, pressure sensor 102 and barometric vent 302 are co-located at pressure sensor cavity 300. However, in other implementations, pressure sensor 102 and barometric vent 302 can be formed as a single module (e.g., the barometric vent may be formed in a portion of pressure sensor housing 347 that itself seals main cavity 304 from liquid or moisture ingress through opening(s) 108).

In some scenarios, occlusion of opening(s) 108 may be detected by device 100 (e.g., based on anomalies in the pressure sensor data from pressure sensor 102 and/or data from other components of device 100 such as Global Positioning System (GPS) components, inertial mass unit (IMU) components, proximity sensors, and/or ambient light sensors. If occlusion of opening(s) 108 is detected by device 100, an alert and/or instructions may be provided (e.g., using display 110 or an audio component of the device) to a user of the device to squeeze the device (e.g., by pressing on display 110 and/or housing 106) to generate the pressure buildup in main cavity 304 that causes airflow 500 to clear the occlusion.

In accordance with various aspects of the subject disclosure, a portable electronic device is provided that includes a housing having an exterior wall having an opening. The portable electronic device also includes a main cavity within the housing. The portable electronic device also includes a pressure sensor cavity within the housing. The portable electronic device also includes an inner wall within the housing that separates the pressure sensor cavity from the main cavity and that includes first and second openings. The portable electronic device also includes a pressure sensor at least partially disposed within the first opening in the inner wall and arranged to receive airflow through the opening in the exterior wall of the housing. The portable electronic device also includes a water-resistant covering over the second opening in the inner wall.

In accordance with other aspects of the subject disclosure, a portable electronic device is provided that includes a housing having an opening. The portable electronic device also includes a pressure sensor disposed in the housing and arranged to sense an ambient pressure of an environment external to the housing using a first airflow through the opening. The portable electronic device also includes a moisture-resistant cavity within the housing. The portable electronic device also includes a barometric vent configured to pass a second airflow, from the moisture-resistant cavity through the opening in the housing, responsive to a rise in pressure in the moisture-resistant cavity.

In accordance with other aspects of the subject disclosure, a portable electronic device is provided that includes a housing and a pressure sensor cavity in the housing. The portable electronic device also includes a pressure sensor to sense a pressure in the pressure sensor cavity. The portable electronic device also includes a barometric vent configured to pass at least a portion of a rise in pressure in an additional cavity within the housing into the pressure sensor cavity.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people.

For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A portable electronic device, comprising:
   a housing having an exterior wall having an opening;
   a main cavity within the housing;
   a pressure sensor cavity within the housing;
   an inner wall within the housing that separates the pressure sensor cavity from the main cavity and that includes first and second openings;
   a pressure sensor at least partially disposed within the first opening in the inner wall and arranged to receive airflow through the opening in the exterior wall of the housing;
   a water-resistant covering over the second opening in the inner wall without extending over the first opening in the inner wall; and
   a barometric vent configured to dislodge debris from the opening by providing an airflow to clear occlusions of the opening.

2. The portable electronic device of claim 1, further comprising a mesh covering over the opening in the exterior wall of the housing.

3. The portable electronic device of claim 1, wherein the mesh covering is configured to allow air and liquid to pass through the opening in the exterior wall of the housing and to discourage solid debris from passing through the opening in the exterior wall of the housing.

4. The portable electronic device of claim 1, further comprising a sealing member disposed between a pressure sensor housing of the pressure sensor and an edge of the first opening in the inner wall.

5. The portable electronic device of claim 4, wherein the pressure sensor housing comprises a port disposed in the first opening in the inner wall.

6. The portable electronic device of claim 5, wherein the pressure sensor housing comprises a portion that is disposed in the main cavity.

7. The portable electronic device of claim 6, wherein pressure sensing components of the pressure sensor are disposed in the portion of the pressure sensor housing.

8. The portable electronic device of claim 7, further comprising a flexible printed circuit disposed in the main cavity and electronically coupled to the pressure sensing components.

9. The portable electronic device of claim 1, further comprising a printed circuit board and a battery disposed in the main cavity.

10. A portable electronic device, comprising:
    a housing having an opening;
    a pressure sensor disposed in the housing and arranged to sense an ambient pressure of an environment external to the housing using a first airflow through the opening;
    a moisture-resistant cavity within the housing, the moisture-resistant cavity being defined by an enclosure formed by the housing and a display of the portable electronic device; and
    a barometric vent configured to dislodge debris from the opening by providing an airflow to clear occlusions of the opening.

11. The portable electronic device of claim 10, further comprising a pressure sensor cavity disposed between the opening in the housing and the moisture-resistant cavity within the housing.

12. The portable electronic device of claim 11, wherein the barometric vent comprises a moisture-resistant opening for the moisture-resistant cavity within the housing.

13. The portable electronic device of claim 11, wherein the pressure sensor cavity has a volume that is smaller than a volume of the moisture-resistant cavity.

14. A portable electronic device, comprising:
    a housing;
    a pressure sensor cavity in the housing;
    a pressure sensor to sense a pressure in the pressure sensor cavity; and
    a barometric vent configured to pass at least a portion of a rise in pressure in an additional cavity within the housing into the pressure sensor cavity, the additional cavity being defined by the housing, wherein the barometric vent is configured to dislodge debris from the opening by providing an airflow to clear occlusions of the opening.

15. The portable electronic device of claim 14, wherein the housing comprises an opening between the pressure sensor cavity and an environment external to the housing that allows an ambient pressure of the environment external to the housing to equalize with the pressure in the pressure sensor cavity.

16. The portable electronic device of claim 15, further comprising a moisture-resistant membrane over the barometric vent.

17. The portable electronic device of claim 16, further comprising a mesh covering over the opening in the housing.

18. The portable electronic device of claim 14, further comprising an inner wall that that separates the pressure sensor cavity from the additional cavity, wherein the barometric vent is formed in the inner wall.

19. The portable electronic device of claim 18, further comprising at least one electronic component enclosed in the additional cavity.

20. The portable electronic device of claim 14, wherein at least a portion of the housing is displaceable such that a displacement of the portion of the housing causes a reduction of a volume and the rise in pressure in the additional cavity.

* * * * *

UNITED STATES PATENT AND TRADEMARK OFFICE
CERTIFICATE OF CORRECTION

Page 1 of 1

PATENT NO. : 10,837,772 B2
APPLICATION NO. : 16/122833
DATED : November 17, 2020
INVENTOR(S) : David MacNeil et al.

It is certified that error appears in the above-identified patent and that said Letters Patent is hereby corrected as shown below:

In the Claims

Column 9, Line 29 (Claim 3), Replace "claim 1", with --claim 2--;

Column 10, Line 44 (Claim 18), Replace "that that", with --that--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*